United States Patent [19]

Stambaugh et al.

[11] 4,160,739

[45] Jul. 10, 1979

[54] POLYOLEFINIC COPOLYMER ADDITIVES FOR LUBRICANTS AND FUELS

[75] Inventors: Robert L. Stambaugh, Hatboro; Richard A. Galluccio, Perkasie, both of Pa.

[73] Assignee: Rohm and Haas Company, Philadelphia, Pa.

[21] Appl. No.: 857,079

[22] Filed: Dec. 5, 1977

[51] Int. Cl.² .................. C10M 1/32; C10M 3/26; C10L 1/14; C08L 23/00

[52] U.S. Cl. .................................. 252/34; 44/62; 44/63; 252/50; 252/51.5 A; 525/301; 525/299

[58] Field of Search ................ 252/56 D, 56 R, 34, 252/51.5 A, 50; 260/878 R; 44/62, 63

[56] References Cited

U.S. PATENT DOCUMENTS

| | | | |
|---|---|---|---|
| 3,687,849 | 8/1972 | Abbott | 252/56 D |
| 3,914,203 | 10/1975 | Lee | 252/51.5 A |
| 3,929,800 | 12/1975 | Horowitz | 252/56 D |
| 4,063,010 | 12/1977 | Marie et al. | 252/51.5 A |
| 4,071,580 | 1/1978 | Alberts et al. | 260/878 R |
| 4,089,794 | 5/1978 | Engel et al. | 252/51.5 A |

*Primary Examiner*—Delbert E. Gantz
*Assistant Examiner*—Irving Vaughn

[57] ABSTRACT

Graft copolymers wherein the backbone polymer is a polymeric hydrocarbon such as ethylene/propylene copolymer and the grafted units are the residues of a monomer system comprising maleic acid or anhydride and one or more other monomers copolymerizable therewith, the monomer system being post-reacted with a polyamine compound. The graft copolymers impart combined detergent, viscosity index improvement and other useful properties to lubricating oils and hydrocarbon motor fuels.

26 Claims, No Drawings

POLYOLEFINIC COPOLYMER ADDITIVES FOR LUBRICANTS AND FUELS

BACKGROUND OF THE INVENTION

This invention relates to graft copolymers as multipurpose additives for lubricating oils and hydrocarbon motor fuels. More particularly, this application relates to graft copolymers, wherein the grafted monomer units are derived from a monomer system comprising maleic acid or anhydride and one or more other monomers copolymerizable therewith, to methods of preparing the graft copolymers, and to lubricating oils and motor fuels containing the graft copolymers.

Internal combustion engine sludge is produced by the oxidative degradation of lubricating oils and by the partial oxidation of motor fuels and byproducts of motor fuel combustion. The partially oxidized byproducts of motor fuel combustion contain reactive intermediates such as aldehydes, acids and hydroxy acids which undergo complex condensation reactions to form insoluble resinous materials known as sludge and varnish. Accordingly, unless the components are dispersed relatively soon after formation, they will settle out of the lubricant, causing filter plugging and sticking of moving parts.

In the past, lubricating oils and hydrocarbon motor fuels have been formulated with several additives to provide a plurality of properties, including improved viscosity-temperature characteristics (viscosity index or "VI"), pour point depressancy, oxidation inhibition, anti-rust and detergency. However, multiple additives add substantially to the cost of a lubricating oil or motor fuel and cause problems of imcompatibility and interaction of the additives. The graft copolymer additives of the present invention combine several of these properties in a single material and therefore provide a significant improvement over mixtures of additives.

While the grafting of polar monomers to polyolefinic backbones to form lubricating oil and motor fuel additives is known, as in U.S. Pat. No. 3,404,091, and the use of maleic anhydrides as a graft monomer is known, as in U.S. Pat. Nos. 3,687,849 and 3,687,905, the products obtained are deficient in various properties and/or are too costly, primarily because insufficient maleic acid or anhydrides is incorporated into the graft copolymer and/or the products contain unduly high levels of byproducts of little or no usefulness, such as homopolymers. Maleic acid or anhydride is particularly desirable as a graft monomer because this monomer is relatively inexpensive and therefore, in theory, is an economical route to incorporation of dispersant nitrogen compounds into polymers by reaction of the nitrogen compounds with the carboxyl groups of the maleic acid or anhydride. However, in practice, maleic acid or anhydride will not polymerize to any substantial extent after grafting and therefore cannot provide the amount of carboxyl functionality required for incorporation of significant amounts of dispersant nitrogen through reaction with carboxyl groups. The graft copolymers of this invention are prepared in a manner which maximizes maleic acid or anhydride incorporation and minimizes byproduct formation.

SUMMARY OF THE INVENTION

The graft copolymers of the invention combine the efficient thickening properties of polyolefinic viscosity index improvers and the dispersancy provided by nitrogen-containing materials by the grafting of a monomer system comprising maleic acid or anhydride and at least one other (different) monomer which is addition copolymerizable therewith, the grafted monomer system then being post-reacted with a polyamine. The copolymerizable monomers are selected for their reactivity with maleic acid or anhydride so that more maleic acid or anhydride may be incorporated into the polymer than would occur in the absence of the comonomers.

In another aspect of the invention, it has been found that the graft copolymers are efficiently produced with little or no wasteful byproduct by forming an intimate admixture of backbone polymer, copolymerizable monomer system, and a free radical initiator, wherein the temperature of the mixture, at least during the time that the initiator is being uniformly dispersed therein, is maintained below the decomposition temperature of the initiator. Thereafter, the temperature is increased to or above the temperature at which the initiator decomposes, preferably while continuing agitation of the reaction mixture, to form a graft copolymer, followed by post-reaction with a polyamine.

In still another aspect of the invention, the substrate backbone polymer has a relatively high molecular weight, of the order of about 100,000–200,000 viscosity average molecular weight, and contrary to prior practice, the backbone polymer is not degraded prior to the grafting. The molecular weight of the final graft copolymer is reduced by homogenization or other degrading technique to provide the desired balance of thickening capability, viscosity index improvement, shear stability, detergency and other properties in lubricating oils or motor fuels.

The graft copolymers of this invention have the significant advantage over known nitrogen-containing dispersant VI improvers of lower production cost. Moreover, in many cases the graft copolymers of this invention exhibit activity substantially equivalent to that of kown nitrogen-containing graft copolymers but at lower additive concentrations, thus further enhancing economic advantage.

DETAILED DESCRIPTION

The backbone or substrate polymers are any substantially linear, substantially saturated, rubbery, olefinic hydrocarbon polymers which are oil soluble before or after grafting of the copolymerizable monomers thereon. By "substantially saturated" is meant less than 4 mole % olefinic unsaturation, preferably 2 mole % or less. Polymers having high olefinic unsaturation are too oxidatively unstable when used in lubricating oils. Suitable backbone polymers include ethylene/propylene copolymers, ethylene/propylene/diene modified terpolymers, hydrogenated styrene-butadiene copolymers, styrene-isoprene copolymers and atactic polypropylene. Backbone polymers which can be rendered oil soluble by the grafting or after grafting include low density polyethylene, and the like. The backbone polymers may have a wide range of molecular weight, for example, of the order of about 10,000–200,000 viscosity average molecular weight, more usually about 100,000–150,000. Normally, the graft copolymerization will result in increased molecular weight of the order of about 200,000–400,000 viscosity average and even as high as 500,000 or more. More usually, the molecular weight will be increased to about 200,000–400,000 viscosity average.

The selection of backbone polymer molecular weight and the extent to which the molecular weight is permitted to increase during graft copolymerization depend primarily upon the handling properties of the starting polymer and the shear stability desired in the final product. Low molecular weight starting backbone polymers, the molecular weight of which is prevented from increasing substantially during grafting, will result in more shear stable graft copolymer products and therefore require little or not post-degradation to reduce the molecular weight to levels providing good shear stability. However, the lower molecular weight starting backbone polymer materials are more difficult to handle since they are semi-liquids or exhibit cold flow at ambient temperature (about 20° C.), and it is often difficult or uneconomical to control molecular weight during graft copolymerization. While use of a low molecular weight starting polymer may avoid the need for subsequently degrading the graft copolymer product, the difficulty of handling and processing such starting polymers tends to override any such advantage. Accordingly, it is preferred to use a somewhat higher molecular weight starting backbone polymer, of the order of at least about 100,000 viscosity average molecular weight, to avoid such problems. The molecular weight of the substrate polymer will differ, of course, depending upon the type of substrate backbone polymer.

The ethylene/propylene (EP) copolymers may have a wide rang of ethylene/propylene ratios. Above about 80 mole percent ethylene, the copolymers are partially crystalline, thus losing their oil solubility and their utility as substrates for this invention. The more useful ethylene/propylene substrates contain about 50 to about 70 mole percent ethylene, have viscosity average molecular weights of about 10,000 to about 200,000 and $\overline{M}_w/\overline{M}_n$ of less than four. Lower propylene contents, higher molecular weights, and broader molecular weight distributions can be used but, as indicated above, such copolymers lead to grafted products which are generally less efficient as VI (viscosity index) improvers. In terms of Mooney viscosity (ASTM test D-1646, ML 1+8 at 125° C.) the EP substrate polymer should have a value of about 20–40 to avoid undue cold flow, preferably about 28±4. Above 50 the mixture tends to be too viscous for adequate mixing.

The ethylene/propylene diene modified terpolymers contain low levels (preferably less than 10%) of a non-conjugated diene such as 1,4-hexadiene, dicyclopentadiene or ethylidenenorbornene. Maximum ethylene is determined by crystallinity (solubility) considerations with the preferred range being about 45–65 mole percent ethylene. The more useful viscosity average molecular weight is also about 10,000 to about 200,000 with $\overline{M}_w/\overline{M}_n$ of less than eight. Again, substrates outside of these ranges can be used at some sacrifice in properties of the VI improver.

The hydrogenated styrene-butadiene copolymers are preferably random copolymers containing about 30 to about 55 weight percent butadiene and have viscosity average molecular weights of about 25,000 to about 125,000. Hydrogenation is over 95% of the olefinic unsaturation but less than 5% of the aromatic unsaturation.

In the case of the hydrogenated styrene-isoprene copolymers, the substrates are preferably but not exclusively block copolymers. The polymers may possess two or more blocks but in general the styrene blocks are of about 5000 to about 50,000 in molecular weight and have been reduced by hydrogenation of at least 50% of the aromatic groups while the isoprene units may range from about 10,000 to about 1,000,000 in molecular weight and are also reduced in olefinic unsaturation by at least 50%. Random copolymers fitting the general styrene-butadiene description may also be used.

Amorphous polypropylene of viscosity average molecular weight in the range of about 10,000 to about 200,000 can also be used as a substrate for grafting. This entire class of substrates will result in generally acceptable dispersants, but they tend to lead to graft copolymers which have somewhat poorer properties as VI improvers.

It will be understood by those skilled in the art that all of the above recited substrate polymers are specified so as to provide graft copolymers which are both superior dispersants and good viscosity index improvers. While polyolefinic substrates outside of these ranges can be used and will produce graft copolymers which are good dispersants, the products will be somewhat inferior as viscosity index improvers.

The monomers copolymerizable with maleic acid or anhydride (preferably maleic anhydride) are any $\alpha,\beta$-monoethylenically unsaturated monomers which are sufficiently soluble in the reaction medium and reactive towards maleic acid or anhyrie so that substantially higher amounts of maleic acid or anhydride can be incorporated into the grafted polymeric product than is obtainable using maleic acid or anhydride alone. Suitable monomers include the esters, amides and nitriles of acrylic and methacrylic acid, and other monomers containing no free acid groups. Representative of these classes are the methyl, ethyl, propyl, butyl, pentyl, hexyl, cyclohexyl, 2-ethylhexyl, and isodecyl esters of acrylic or methacrylic acid. Other useful monomers are styrene, $\alpha$-methyl styrene, $C_1$–$C_4$ alkyl and alkoxy ring substituted styrenes such as p-methyl styrene, p-sec. butyl styrene, p-methoxy styrene, and $C_4$–$C_{12}$ alpha olefins such as isobutylene, and the like. Other types of monomers are the vinyl esters such as vinyl acetate, propionate and butyrate; vinyl ketones such as methyl and ethyl vinyl ketone; and other vinyl and vinylidene monomers such as vinyl chloride and vinylidene chloride. Any mixtures of two or more of the comonomers may be used. Comonomers containing more than one polymerizable double bond and/or functional groups which may induce crosslinking or gelation, such as hydroxyl, primary and secondary amino groups, should be avoided. Conjugated diolefins, such as butadiene, may be used in minor amounts since such monomers have less tendency to crosslink than do the non-conjugated diolefins. Although the monomers may contain up to about 40 carbon atoms, those containing up to about 10 carbon atoms are preferred. The higher carbon content comonomers add weight and cost but confer no appreciable advantage in terms of ease of copolymerization with maleic acid or anhydride and resultant VI improvement and dispersancy.

Extensive studies have been made of the reactivity of maleic anhydride with other monomers, including reactivity ratios which will enable the polymer chemist to easily select the monomers and monomer proportions for optimizing the incorporation of maleic anhydride into the graft copolymers of the invention, ranging from the ideal of monomers which alternate with maleic anhydride in each of the grafts to monomers which form blocks or random chains with maleic anhydride in each of the grafts. Such studies include Flory, *Principles* of *Polymer Chemistry*, Cornell University Press, 1953, pps. 178-199, especially Tables XX and XXII, and Brandrup and Immergut, *Polymer Handbook*, 2nd Ed., 1975, John Wiley & Sons, Inc., pages II-105, II-227 to 229.

The monomer ratios will depend on the reactivity of the monomers selected, more comonomer being required when a monomer is chosen which has a greater tendency to homopolymerize than to copolymerize with maleic acid or anhydride. Generally, the ratio will be in the range of about 1:4 to about 4:1, of maleic acid or anhydride to comonomer, preferably about 1:2 to 2:1. Sufficient maleic acid or anhydride should be present in the monomer system to provide about 1-10% by weight of maleic acid or anhydride in the graft copolymer product, based on the weight of the product, preferably about 2-6% by weight.

The graft copolymers are prepared in accordance with conventional free radical copolymerization techniques except for those aspects of the invention relating to formation of an intimate admixture of the reactants with the free radical initiator at a temperature below the decomposition temperature of the initiator, and subsequent increase of reaction temperature above the decomposition temperature of the initiator. Typically, in terms of an ethylene/propylene copolymer as the substrate polymer backbone material, the backbone polymer is dissolved to a concentration of about 20-30% by weight in a suitable inert solvent such as a halogenated aromatic hydrocarbon at a temperature of about 80°-150° C. Dissolution of the polymer is promoted by suitable agitation such as magnetic or mechanical stirring. Graft monomer is then blended into the solution, usually at a lower temperature such as about 80° C., preferably also while the reaction mixture is being agitated. The graft monomers are added to the mixture in a total amount of about 2-30% by weight based on the ethylene/propylene copolymer, preferably about 5-20% by weight. If necessary, the temperature of the mixture is again lowered below the decomposition temperature of the initiator, and the initiator is added and uniformly admixed into the solution. Conditions of temperature, agitation, sequence and rate of addition are carefully selected to minimize homopolymerization and graft copolymerization at this point. The initiator is added in an amount of about 0.5-2% by weight based on the ethylene/propylene copolymer. After the initiator has been uniformly admixed, the temperature is gradually raised to or above the decomposition temperature of the initiator. In the case of t-butylperbenzoate initiator, the temperature is about 120°-140° C. This temperature is maintained until the reaction is substantially complete. About 1-2 hours reaction time is usually sufficient. The reaction product typically will contain about 2-25% by weight of the graft monomers, preferably about 4-20% by weight.

The free radical initiator is any free radical source capable of hydrogen abstraction. Examples are alkyl peroxy esters, alkyl peroxides, alkyl hydroperoxides, diacyl peroxides, etc. While t-butyl perbenzoate is the preferred initiator, other suitable initiators include t-butyl peroctoate, di-t-butylperoxide, t-butylhydroperoxide, cumene hydroperoxide, benzoyl peroxide, and the like.

While the temperature for the grafting reaction may vary from about 80° C. to about 150° C., it will be understood that the temperature selected will depend upon the decomposition temperature of the initiator as well as the substrate polymer and graft monomers. Accordingly, it may be possible to run the grafting reaction at a temperature as low as 60° C. or as high as about 250° C.

As indicated above, another aspect of the invention is formation of an intimate admixture of a substrate polymer, graft monomer and initiator prior to the grafting reaction and maintaining the temperature below the decomposition temperature of the initiator, at least during addition and blending of the initiator into the solution. This prevents formation of free radicals until the reactants are fully and intimately admixed. This procedure eliminates or substantially minimizes formation of undesirable byproducts such as homopolymer, and maximizes grafting of oxygen-containing polar monomer.

During the grafting reaction any solvent medium may be used for the preparation of the graft copolymer provided the medium is substantially inert to the reactants, that is, the medium has little or no chain transfer capability. Halogenated aromatic hydrocarbons such as chlorobenzene and dichlorobenzene are preferred, particularly dichlorobenzene. However, aliphatic or aromatic hydrocarbons including mineral oil are useful in some cases.

Although the process has been illustrated in terms of dissolving the copolymerizable reactants in a solvent, the process may be operated without solvent if the substrate polymer and mixture with the graft monomers have sufficiently low melt viscosities for effective intimate admixture and grafting at the reaction temperatures. Order and rate of addition of the reactants and initiator are not critical, providing the temperature is controlled as indicated.

The carboxyl groups provided by the maleic acid or anhydride grafts are post-reacted with a non-polymerizable polyamine to form a structure which for convenience is called a "carboxyl-polyamine adduct." The polyamine is added in a sufficient amount to react with substantially all of the carboxyl functionality. While "neutralization" is the term often applied to this reaction, the product may be an amide, imide, amidine, or other structure, and all such structures are intended to be included in the term "carboxyl-polyamine adduct." Essentially, the polyamine must contain only one amino group which is reactive with the carboxyl groups of the maleic acid or anhydride graft. Additional reactive amino groups tend to cause interfering reactions. The reactive amino group is a primary or secondary amino group whereas all other nitrogen in the polyamine should be essentially non-reactive towards the carboxyl of the maleic acid or anhydride graft.

The polyamines may be characterized as aliphatic, cycloaliphatic, aromatic or heterocyclic, and may have mixed character. The polyamines may carry other functional groups, such as hydroxyl, provided such groups do not cause interfering reactions. Examples of suitable polyamines are dimethylamino-ethylamine, dibutylamino-ethylamine, 3-dimethylamino-1-propylamine, 4-methylethylamino-1-butylamine, pyridyl-ethylamine, N-morpholino-ethylamine, tetrahydropyridyl-ethylamine, bis-(dimethylamino)propylamine, bis-(diethylamino)ethylamine, N,N-dimethyl-p-phenylene diamine, piperidyl-ethylamine, 1-aminoethyl pyrazone, 1-(methylamino)pyrazoline, 1-methyl-4-aminooctyl pyrazole, 1-aminobutyl imidazole, 4-aminoethyl thiazole, 2-aminoethyl triazine, dimethylcarbamyl propylamine, N-methyl-N-aminopropyl acetamide, N-aminoethyl succinimide, N-methylamino maleimide, N-aminobutyl-alpha-chlorosuccinimide, 3-aminoethyl uracil, 2-aminoethyl pyridine, ortho-aminoethyl-N,N-dimethylbenzenesulfamide, N-aminoethyl phenothiazine, N-aminoethylacetamidine, 1-aminophenyl-2-methyl-imidazoline, N-methyl-N-aminoethyl-S-ethyl-dithiocarbamate, N-phenylurea, N-(3-aminopropyl)-morpholine, 4-aminomethylpyridine, N-(3-aminopropyl)-2-pyrrolidinone, N-(3-aminopropyl)-N'-methylpiperazine, 1-(2-aminoethyl)-2-methyl-2-imidazoline, N-(5-aminopentyl)-2,5-dimethylpyrrole, 2-aminothiazole, 2-aminobenzothiazole.

The polyamines thus preferably contain a single primary or secondary amino group and at least one tertiary amino such as a heterocyclic amino group. The latter include amino-alkyl-substituted piperidines, morpholines, piperazines, pyridines, pyrrolidines, pyrroles, benzopyrroles, quinolines, indoles and the like. Polyamines having non-reactive nitrogen in other groups are also useful, such as substituted primary or secondary amines in which the substituent is derived from pyrrolidones, caprolactams, oxazolidones, oxazoles, thiazoles, pyrazoles, pyrazolines, imidazoles, imidazolines, thiazines, oxazines, diazines, oxycarbamyl, thiocarbamyl, uracils, hydantoins, thiohydantoins, guanidines, ureas, sulfonamides, phosphoramides, phenothiazines, amidines, and the like. The polyamines may contain up to about 6 nitrogen atoms, preferably 2 to 4, and may contain 4 to about 30 carbon atoms, preferably 4 to about 12.

Reaction of the graft copolymer with the polyamine is conveniently effected in the solvent reaction medium containing the graft copolymer. If desired, the graft copolymer may be separated and redissolved or the reaction product concentrated before addition of the polyamine. The reaction is carried out at a temperature of at least about 80° C., preferably at about 120° C. to about 300° C. but short of the temperature at which the graft copolymer decomposes. The more usual temperature range is about 150°–250° C. An excess of polyamine over the stoichiometric amount required for complete reaction is desirable, of the order of about a 1–10% excess. Reaction is essentially complete when titration shows remaining no more than about 2% of the carboxyl groups of the graft copolymer.

POST-DEGRADATION

When polymeric viscosity index improvers are subject to the severe mechanical stresses of operating equipment, the polymers may be degraded, thus diminishing the favorable influence which such additives exert on viscosity-temperature properties of a lubricant or motor fuel. Polymers which resist this tendency to degrade mechanically in service are said to have good shear stability. The ability of viscosity index improvers to resist mechanical degradation with use is dependent on a number of factors, one of which is molecular weight. A very high molecular weight polymer, although imparting initially high effective control of viscosity-temperature properties, will be very substantially degraded in service and thus lose much or even nearly all of its effect.

The graft copolymers prepared by the process of this invention may be too high in molecular weight to be usable even though they are good VI improvers; that is, they have poor shear stability. As indicated above, this derives in part from the technology and manufacturing processes which are employed in the rubber industry, in particular by makers of ethylene/propylene copolymers and terpolymers. Such polymers are routinely made at very high molecular weight so that the products will be relatively hard solids and therefore more easily handled and transported. When these rubbers are prepared in molecular weight appropriate for use as VI improvers, the polymers are very sticky solids, which flow or "creep" even at ambient temperatures. Although technology is available to process these lower molecular weights, as in the oxidative degradation processes of U.S. Pat. Nos. 3,404,091 and 3,687,849, special handling is required and the processing is slower, resulting in higher costs. Hence, when conventional ethylene/propylene rubbers are used in the process of this invention, the products are too high in molecular weight to provide acceptable shear stability.

Another factor adversely affecting the shear stability of the products of this invention is a result of an important aspect of the invention itself. During the grafting reaction, noticeable thickening takes place, and evaluation of the graft copolymer indicates that shear stability deteriorates during the grafting reaction. This very likely results from crosslinking that may occur as part of the reaction. Although it is possible to eliminate this cross-linking, the products so prepared generally are inferior dispersants. Hence, it appears to be inherent to some extent in the graft process of this invention that to obtain optimum dispersancy, some compromise in shear stability is necessary.

Means to bring the molecular weight down into the desirable range, that is, to where shear stability will be good, are readily available. It requires only mechanical or thermal degradation of the product subsequent to the grafting reaction to adjust the molecular weight to the preferred range. It is estimated that while the products of the grafting reaction may range upwards in viscosity average molecular weight to about 500,000 or more, the desired range for the final dispersant VI improver is about 30,000 to about 80,000.

Any convenient means of degradation, such as in a gear pump or extruder is acceptable but homogenization is preferred. In a homogenization process the polymer is forced at high pressure through a device which utilizes variously designed throttle valves and narrow orifices. Such a device can generate shear rates of about 5000 sec.$^{-1}$ and more preferably of between about 10,000 and about 1,000,000 sec.$^{-1}$. Commercial devices such as that from the Manton-Gaulin Manufacturing Company or modifications thereof may be employed. Such equipment may be operated at pressures of up to about 20,000 psi to generate the necessary shear stress. The homogenization process may be employed in either a batch or continuous mode, depending on the degree of degradation desired.

An additional benefit of homogenization is that the products of this invention become even more efficient thickeners than the commercially available non-dispersant ethylene/propylene copolymers. Hence, the products of this invention, when homogenization is also used, possess not only superior dispersancy characteristics but also an outstanding thickening ability/shear stability balance.

Utility

The products of this invention may be used in a wide variety of fuels and lubricants. They are primarily of utility in lubricants, where both their superior dispersancy and their influence on viscosity-temperature control are of value. Appropriate lubricant base stocks include oils of both mineral (petroleum) and synthetic origin. The oils may vary in viscosity from spindle oils to motor oils to gear oils. Suitable synthetic fluids include esters such as dialkyl adipate, dialkyl sebacate, or dialkyl azelate, triesters of trimethylolpropane, tetraesters of pentaerythritol, polyalkyleneglycol esters, phosphate esters, or synthesized hydrocarbons of the poly-α-olefin or alkylbenzene types. Typical applications include hydraulic fluids, automatic transmission fluids, automative crankcase oils, gear oils, and greases.

The products of this invention may be used in lubricants at about 0.1% to about 5.0% by weight, preferably about 0.3–2.0% by weight, but more typically at about 0.6% to about 1.5%. As these products are rubbery solids, they are routinely manufactured as viscous concentrates at about 7 to about 15% solids in oil, and the commercial user would accordingly use an amount of the concentrate giving the above recited range of polymeric ingredient.

The lubricants containing the products of this invention may also include other additives to provide additional dispersancy, viscosity-temperature control, pour point depressancy, high temperature detergency, rust inhibition, anti-wear agents, antioxidants, extreme pressure agents, friction modifiers, anti-foam agents or dyes. Accordingly, there may be used with the products of this invention polybutene-based succinimides or esters, phosphosulfurized polybutenes, polyacrylates or polymethacrylates, polyisobutylene, ethylene/propylene copolymers or terpolymers, hydrogenated styrene-butadiene or styrene-isoprene, N-vinylpyrrolidone- or dimethylaminoethyl methacrylate-containing copolymers with methacrylates, styrene polyesters, ethylene-vinyl acetate copolymers or oligomers, dialkyl fumarate polymers or copolymers, esterified styrene-maleic anhydride copolymers or oligomers, hydrocarbon wax-naphthalene condensates of the Friedel-Crafts type, chlorinated hydrocarbons, alkaline earth sulfonates, phenates, salicylates or phenate sulfides, alkaline earth alkylnaphthalene sulfonates, zinc or other metallic dialkyldithiophosphates or diaryldithiophosphates, zinc, cadmium, lead, molybdenum, or other metallic dithiocarbamates, sulfurized or phosphosulfurized esters or terpenes, hindered phenols, phenothiazine or alkylated phenothiazines, naphthylamines, phenylenediamines, dibenzyl disulfide, sulfurized diisobutylene or tri-isobutylene, trialkyl or triaryl phosphites, tricresyl phosphate or silicone polymers, and the like.

When the products of this invention are used in hydrocarbon motor fuels, where primary use is made of their superior dispersancy, generally lower levels will be used, typically about 0.001% to about 0.1% by weight. The fuels include both gasoline and diesel types, and may also contain other additives such an antioxidants, metal deactivators, stabilizers, anti-rust agents, injector detergents, induction system deposit control additives or other carburetor detergents.

Throughout this specification and the following illustrative examples, all parts and percentages are by weight, unless otherwise stated. The detergency test data are based on the following test procedures:

DISPERSANCY TEST PROCEDURES

A. Asphaltenes Test

A method for determining the dispersing activity of any given polymer is based on the capacity of the polymer to disperse asphaltenes in a typical mineral oil. The asphaltenes are obtained by oxidizing a naphthenic oil with air under the influence of a trace of iron salt as catalyst, such as ferric naphthenate. The oxidation is desirably accomplished at 175° C. for approximately 72 hours by passing a stream of air through a naphthenic oil to form a sludge which may be separated by centrifuging. The sludge is freed from oil (extracting it with pentane). It is then taken up with chloroform and the resulting solution is adjusted to a solids content of about 2% (weight by volume).

When a polymer is to be examined for its dispersing activity, it is dissolved in a standard oil, such as a solvent-extracted 100 neutral oil. Blends may be prepared to contain percentages varying from about 2% to about 0.01% or even lower of polymer in oil.

A 10 ml. sample of a blend is treated with 2 ml. of the standard solution of asphaltenes in chloroform. The sample and reagent are thoroughly mixed in a test tube and the tube is placed in a forced draft oven at either 90° C. or 150° C. for two hours to drive off volatile material. The tube is then allowed to cool and the appearance of the sample is noted.

If the polymer has dispersing activity, the oil will appear clear although colored. Experience has demonstrated that, unless a polymer exhibits dispersing activity, at concentrations below about 2% in the above test, it will fail to improve the cleanliness of engine parts in actual engine tests.

B. Sequence V-C Test

This test is an engine test procedure that evaluates crankcase motor oil with respect to sludge and varnish deposits produced by engine operation under a combination of low and midrange temperatures. This test also indicates a capacity of the oil to keep positive crankcase ventilation (PCV) valves clean and functioning properly. Following is a summary of the test.

The test uses a 302 C.I.D., V-8 "Sequence V-C Oil Test Engine and Parts Kit" obtained from Ford Motor Company. The test engine is completely disassembled, cleaned and rebuilt in a specified manner. It is then installed on a dynamometer test stand equipped with appropriate accessories for controlling speed, load and other conditions. It is operated with certified MS-08 fuel in three stages. During stage 1, the engine is operated for 120 minutes at high power output with moderate oil and water temperatures and a lean air/fuel ratio (A/F). Stage 2 operates for an additional 75 minutes at higher oil and water temperatures. During stage 3, the engine is operated for 45 minutes at low RPM with low oil and water temperatures and with a rich A/F. Four cycles each of four hours duration are run each day until 48 cycles (192 engine operating hours) are accumulated.

At the conclusion of the test, the engine is completely disassembled to determine the extent of wear, sludge, varnish and valve deposits. In addition, clogging of the PCV valve, oil rings and oil screen are determined. The test evaluates the sludge dispersant characteristics of a lubricant under low and medium temperature operating conditions. The test engine is operated under conditions described in ASTM Special Technical Publication No. 315F.

EXAMPLE 1

A. Preparation of Graft Copolymer

A 350 g. sample of a 50/50 ethylene/propylene copolymer ("Epcar" 506, Goodrich Chemical Co.) is charged to a 5 l. flask containing 1050 g. o-dichlorobenzene. After sparging with nitrogen, the contents of the flask are heated to approximately 150° C. and mixed using a metal "C" type stirrer to effect a homogeneous solution. During this step and throughout the entire reaction cycle a nitrogen blanket is maintained. Within 2 hours a homogeneous solution is obtained. The polymer solution is then cooled to 80° C. at which temperature 35.0 g. methyl methacrylate (MMA) and 17.5 g. maleic anhydride (MAH) are added. These monomers are thoroughly blended into solution over 35 minutes. A mixture of 1.75 g. t-butyl perbenzoate initiator in 25 g. o-dichlorobenzene is then added. The temperature is then increased to bring the reaction mixture to 140° C. in about 45 minutes. At about 120° C. the grafting reaction begins, as indicated by an increase in solution viscosity. The solution temperature is maintained at 140° C. for 1 hour to complete the graft reaction step before diluting with 1500 g. 100 neutral viscosity oil. The nitrogen flow is then discontinued and vacuum stripping apparatus consisting of a condenser and receiver are attached. The solution is stripped at 1.0 mm. Hg and 140° C. Total stripping time is about 3 hours. Infrared assay of isolated polymer confirms the presence of both MMA and MAH in the final polymer product. Titration of the polymer solution indicates that 89.1% of the MAH charged is grafted. Assay of the distillate recovered after stripping indicates that 88.5% of the MMA charged is grafted. The grafted olefin polymer contains 8.9% MMA and 4.5% MAH.

B. Preparation of Post-Reacted Product 3500 g. of an 8.4% polymer solution prepared in Part A is charged to a 5 l. flask equipped with thermometer, stirrer and nitrogen inlet. With nitrogen flowing, heat is applied. Upon reaching 140° C., 21.6 g. N-(3-aminopropyl) morpholine (NAPM) is charged to the polymer solution. Within 15 minutes the solution viscosity increases significantly. The solution viscosity returns to approximately its original level within about 2 hours of the NAPM addition, presumably as the amic-acid is converted to imide. The solution is further heated with stirring for 16 hours before the nitrogen inlet is replaced by a condenser and collection vessel to facilitate vacuum stripping of unreacted NAPM. After approximately 1 hour at 150° C. and 2.0 mm Hg, all unreacted NAPM is removed. After stripping, the solution is homogenized at 16,000 psi in a Kobe Size 3, 30,000 psi Triplex Pump to reduce the polymer molecular weight. Analytical assay of the final product gives a Kjeldahl nitrogen content of 0.76%, indicating a 6.1% NAPM content, expressed as the maleimide. Infrared assay of isolated polymer confirms imide formation with no apparent residual anhydride bands.

Utilizing the standard asphaltenes dispersancy test described above, 0.0625 gm. of polymeric product disperses 0.4% asphaltenes at 150° C.

An SAE 10W/40 oil is prepared by blending 12.4 weight % of the concentrate of the final homogenized imide product, 1.5 weight % of a commercial zinc dialkyl dithiophosphate anti-wear additive and 2.0% of an overbased magnesium sulfonate, in a Mid-Continent solvent refined lubricating oil base stock. This oil thus contains 1.04% of the product copolymer. When evaluated in the Sequence V-C engine test described above, a merit rating of 9.0 sludge, 8.3 varnish and 7.2 piston skirt varnish is achieved after 200 test hours.

EXAMPLE 2

The procedures of Example 1 are repeated in all essential respects except for use of N,N-dimethylaminopropylamine (NN-DMAPA, 22.5 g) in place of the N-(3-aminopropyl) morpholine and the polymer product of Part A is used as a 9.8% polymer solution. Analytical assay of the final product gives a Kjeldahl nitrogen content of 0.94, indicating a 6.1% N,N-DMAPA content, expressed as maleimide. Infrared assay of isolated polymer indicates imide formation with no residual anhydride bands.

Using the standard asphaltenes dispersancy test described above, 0.0625 g. of polymeric product disperses 0.4% asphaltenes at 150° C.

An SAE 10W/40 oil is prepared by blending 14.6 weight % of the final homogenized product (1.43% polymer in the final blend), 1.5 weight % of a commercial zinc dialkyl dithiophosphate anti-wear additive and 2.0% of an overbased calcium sulfonate, in a Mid-Continent, solvent-refined lubricating oil base stock. When evaluated in the Sequence V-C engine test described avove, a merit rating of 9.6 sludge, 8.4 varnish and 7.9 piston skirt varnish is achieved after 192 hours.

EXAMPLE 3

The procedures of Example 1 are repeated in all essential respects except for use of 4-aminomethyl pyridine (AMP 30.0 g) in place of the N-(3-aminopropyl) morpholine and use of the polymer product of Part A as a 12.3% polymer solution. Analytical assay of the final product gives a Kjeldahl nitrogen content of 0.82%, indicating 5.6% AMP content, expressed as maleimide. Infrared assay of isolated polymer confirms imide formation with no residual anhydride bands.

Using the standard asphaltenes dispersancy test described above, 0.125 g. of polymeric product disperses 0.4% asphaltenes at 150° C.

An SAE 10W/40 oil is prepared by blending 11.2 weight % of the final homogenized product (1.35% polymer in the final oil formulation), 1.5 weight % of a commercial zinc dialkyl dithiophosphate anti-wear additive and 2.0% of an overbased calcium sulfonate, in a Mid-Continent, solvent-refined lubricating oil base stock. When evaluated in the Sequence V-C engine test described above, a merit rating of 9.7 sludge, 8.0 varnish and 7.4 piston skirt varnish is achieved after 192 hours.

EXAMPLE 4

Part A of Example 1 is repeated in all essential respects except that styrene (20.0 g) is used in place of MMA. Analysis shows that the graft copolymer contains 5.0% styrene and 4.5% MAH.

The graft copolymer product is reacted with N-(3-aminopropyl) morpholine essentially as described in Part B of Example 1. The final product contains about 6.0% of the imide product and exhibits dispersancy as measured by the asphaltenes test described above.

EXAMPLES 5–9

Part A of Example 1 is repeated in all essential respects except that methyl acrylate (35.0 g) is used in place of MMA as graft monomer with maleic anhydride. The graft copolymer product is then post-reacted with the amines listed in Table I below under conditions substantially equivalent to those described in Part B of Example 1 except that the thus post-reacted product graft copolymer is not homogenized to a lower molecular weight. (Dispersancy does not depend on the improved shear stability imparted by the homogenization). Table I gives dispersancy ratings by the Asphaltenes Test described above. All of the post-reacted products show dispersant activity. The products also provide viscosity index improvement, afforded by the backbone polymer, when used in lubricating oils.

EXAMPLES 10–16

The amines listed in Table I (Examples 10–16) are reacted with the product of Example 1, Part A, by a process equivalent in all essential respects to that of Part B of Example 1 except for absence of homogenization. Table I shows, by Asphaltenes Dispersancy test data, that the products provide good dispersancy in lubricating oils. Viscosity Index improvement is also afforded by the products, due primarily to the backbone polymer.

TABLE I

| Example | Post-Reacted Amine | Asphaltenes Rating[1] |
|---|---|---|
| 5 | N,N-Dimethylaminopropylamine | 6 |
| 6 | N-(2-Aminoethyl)morpholine | 5 |
| 7 | N-(3-Aminopropyl)morpholine | 4 |
| 8 | 1-(2-Aminoethyl)-2-methyl-2-imidazoline | 1 |
| 9 | N-(5-Aminopentyl)-2,5-dimethyl pyrrole | 1 |
| 10 | N-Phenylurea | 1 |
| 11 | N-(2-Aminoethyl)morpholine | 3 |
| 12 | 2-(2-Aminoethyl)pyridine | 6 |
| 13 | N-(3-Aminopropyl)-2-pyrrolidone | 5 |
| 14 | N-(3-Aminopropyl)-N'-methyl-piperazine | 6 |
| 15 | 2-Aminothiazole | 3 |
| 16 | 2-Aminobenzothiazole | 3 |

| [1]Rating Scale: | Rating | Concentration Necessary for Passing Results |
|---|---|---|
| | 1 | 2.0 |
| | 2 | 1.0 |
| | 3 | 0.5 |
| | 4 | 0.25 |
| | 5 | 0.12 |
| | 6 | 0.06 |

We claim:

1. A composition comprising a major amount of a lubricating oil and a minor detergent amount of a graft copolymer comprising an oil soluble, substantially linear, substantially saturated, rubbery, olefinic hydrocarbon backbone polymer and graft polymerized thereon, copolymerized units of a monomer system comprising maleic acid or maleic anhydride and one or more other monomers copolymerizable with maleic acid or maleic anhydride, said copolymerized units being post-reacted with a polyamino compound having one reactive primary or secondary amino group.

2. The composition of claim 1 wherein said other monomers are selected from one or more groups consisting of $C_1$–$C_{12}$ alkyl esters of acrylic and methacrylic acid, styrene, α-methyl styrene, $C_1$–$C_4$ alkyl and alkoxy ring substituted styrene, $C_4$–$C_{12}$ alpha olefins, vinyl esters, vinyl ketones, and vinyl and vinylidene chloride, and the polyamino compounds contain at least one tertiary amino group.

3. The composition of claim 1 wherein the ratio of maleic acid or anhydride to said other monomer is about 1:4 to 4:1 by weight, and said graft copolymer contains about 1–10% by weight of said maleic acid or anhydride.

4. The composition of claim 1 wherein said backbone polymer is selected from polyolefins, ethylene/propylene copolymers, ethylene/propylene/diene modified copolymers, hydrogenated styrene-butadiene copolymers, and hydrogenated styrene-isoprene copolymers.

5. The composition of claim 1 wherein said backbone polymer is an ethylene-propylene copolymer, said grafted monomers are maleic anhydride and methyl methacrylate, and said amino compound is N-(3-aminopropyl) morpholine.

6. The composition of claim 1 wherein said backbone polymer is an ethylene-propylene copolymer, said grafted monomers are maleic anhydride and styrene, and said amino compound is N-(3-aminopropyl) morpholine.

7. The composition of claim 1 wherein said backbone polymer is an ethylene-propylene copolymer, said grafted monomers are maleic anhydride and methyl methacrylate, and said amino compound is N,N-dimethylaminopropylamine.

8. The composition of claim 1 wherein said backbone polymer is an ethylene-propylene copolymer, said grafted monomers are maleic anhydride and methyl methacrylate, and said amino compound is 4-aminomethyl pyridine.

9. A composition comprising a major amount of a lubricating oil and a minor detergent amount of a graft copolymer prepared by intimately admixing (a) an oil soluble, substantially linear, substantially saturated, rubbery, olefinic hydrocarbon backbone polymer, (b) a graft monomer system comprising maleic acid or maleic anhydride and at least one other monomer copolymerizable therewith, and (c) a free radical initiator, the temperature during admixing in the presence of the initiator being below the decomposition temperature of the initiator, and thereafter increasing the temperature of the mixture to or above the decomposition temperature of the initiator, followed by post-reaction of the monomer system with a polyamino compound having one reactive primary or secondary amino group.

10. The composition of claim 9 wherein the backbone polymer and graft monomers are dissolved in a solvent, and the initiator is thereafter intimately admixed therein while maintaining the temperature below the decomposition temperature of the initiator.

11. The composition of claim 10 wherein the solvent is a halogenated aromatic hydrocarbon.

12. The composition of claim 10 wherein the solvent is a mineral oil.

13. A composition comprising a major amount of a hydrocarbon motor fuel and a minor detergent amount of a graft copolymer comprising an oil soluble, substantially linear, substantially saturated, rubbery, olefinic hydrocarbon backbone polymer and graft polymerized thereon, copolymerized units of a monomer system comprising maleic acid or maleic anhydride and one or more other monomers copolymerizable with maleic acid or maleic anhydride, said copolymerized units being post-reacted with a polyamino compound having one reactive primary or secondary amino group.

14. A graft copolymer useful as an additive for lubricating oils and hydrocarbon motor fuels, comprising an oil soluble, substantially linear, substantially saturated, rubbery, olefinic hydrocarbon backbone polymer and graft polymerized thereon, copolymerized units of a monomer system comprising maleic acid or maleic anhydride and one or more other monomers copolymerizable with maleic acid or maleic anhydride, said copolymerized units being post-reacted with a polyamino compound having one reactive primary or secondary amino group.

15. The graft copolymer of claim 14 wherein said other monomers are selected from one or more groups consisting of $C_1$–$C_{12}$ alkyl esters of acrylic and methacrylic acid, styrene, α-methyl styrene, $C_1$–$C_4$ alkyl and alkoxy ring substituted styrene, $C_4$–$C_{12}$ alpha olefins, vinyl esters, vinyl ketones, and vinyl and vinylidene chloride, and the polyamino compounds contain at least one tertiary amino group.

16. The graft copolymer of claim 14 wherein the ratio of maleic acid or anhydride to said other monomer is about 1:4 to 4:1 by weight, and said graft copolymer contains about 1–10% by weight of said maleic acid or anhydride.

17. The graft copolymer of claim 14 wherein said backbone polymer is selected from polyolefins, ethylene/propylene copolymers, ethylene/propylene/diene modified copolymers, hydrogenated styrene-butadiene copolymers, and hydrogenated styrene-isoprene copolymers.

18. The graft copolymer of claim 14 wherein said backbone polymer is an ethylene-propylene copolymer, said grafted monomers are maleic anhydride and methyl methacrylate, and said amino compound is N-(3-aminopropyl) morpholine.

19. The graft copolymer of claim 14 wherein said backbone polymer is an ethylene-propylene copolymer, said grafted monomers are maleic anhydride and styrene, and said amino compound is N-(3-aminopropyl)-morpholine.

20. The graft copolymer of claim 14 wherein said backbone polymer is an ethylene-propylene copolymer, said grafted monomers are maleic anhydride and methyl methacrylate, and said amino compound is N,N-dimethylaminopropylamine.

21. The graft copolymer of claim 14 wherein said backbone polymer is an ethylene-propylene copolymer, said grafted monomers are maleic anhydride and methyl methacrylate, and said amino compound is 4-aminomethyl pyridine.

22. A process for preparing a graft copolymer useful as a lubricating oil or hydrocarbon motor fuel additive, comprising intimately admixing (a) an oil soluble, substantially linear, substantially saturated, rubbery, olefinic hydrocarbon backbone polymer, (b) a graft monomer system comprising maleic acid or maleic anhydride and at least one other monomer copolymerizable therewith, and (c) a free radical initiator, the temperature during admixing in the presence of the initiator being below the decomposition temperature of the initiator, and thereafter increasing the temperature of the mixture to or above the decomposition temperature of the initiator, followed by post-reaction of the monomer system with a polyamino compound having one reactive primary or secondary amino group.

23. The process of claim 22 wherein the backbone polymer and graft monomers are dissolved in a solvent, and the initiator is thereafter intimately admixed therein while maintaining the temperature below the decomposition temperature of the initiator.

24. The composition of claims 1 or 9 wherein the polyamino compound is N-phenylurea.

25. The graft copolymer of claim 14 wherein the polyamino compound is N-phenylurea.

26. The process of claim 22 wherein the polyamino compound is N-phenylurea.

* * * * *